Dec. 11, 1928.

S. SEABERG ET AL 1,694,692

MAGNETIC CIRCUIT CONTROL APPARATUS

Filed Oct. 28, 1924  3 Sheets-Sheet 1

Inventors:
Severin Seaberg.
Harry W. Anderson.
by Merrill M. Blackburn
Atty.

Dec. 11, 1928.　　　　　　　　　　　　　　　　1,694,692
S. SEABERG ET AL
MAGNETIC CIRCUIT CONTROL APPARATUS
Filed Oct. 28, 1924　　　3 Sheets-Sheet 2

Inventors:
SEVERIN SEABERG,
HARRY W. ANDERSON.
by Merrill M. Blackburn
Atty.

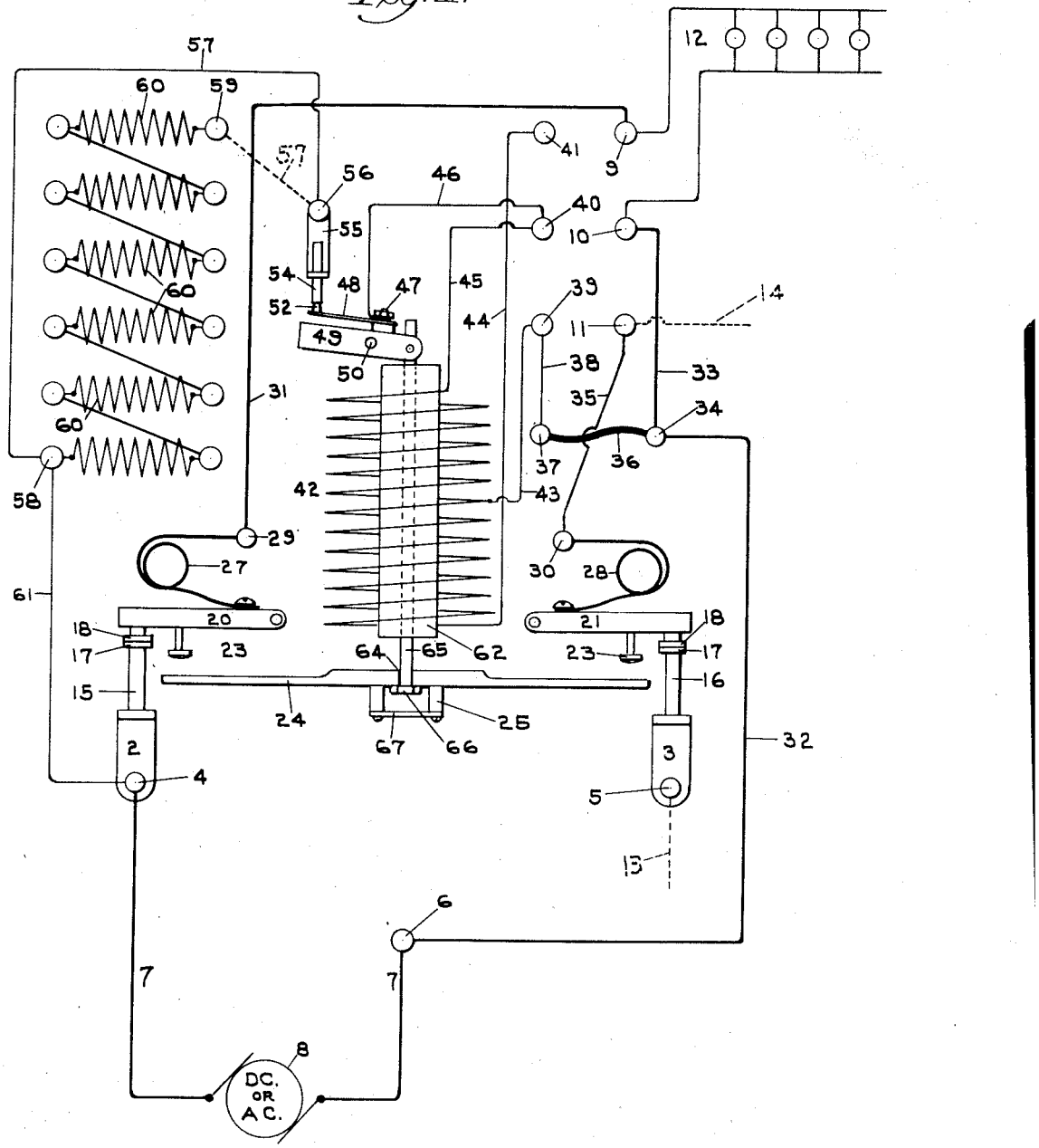

Patented Dec. 11, 1928.

1,694,692

UNITED STATES PATENT OFFICE.

SEVERIN SEABERG AND HARRY W. ANDERSON, OF MOLINE, ILLINOIS.

MAGNETIC CIRCUIT-CONTROL APPARATUS.

Application filed October 28, 1924. Serial No. 746,360.

This invention relates to an improvement in circuit interrupters of that type designed for the periodic and automatic making and breaking of a circuit, in order that the current may be intermittently supplied to the point of use, as, for example, an electrical sign.

Among the objects of our invention are to produce a device of the character indicated which is adaptable for use on either direct or alternating current; to produce a device which will result in constant but adjustable timing for the making and breaking of light circuits; to provide novel means for converting a switch adaptable for use upon alternating current circuits into one adaptable for use in connection with direct current circuits; to produce a device which will result in the quick making and breaking of an electrical circuit; to provide novel means for adjusting the length of the periods during which the circuit control switches are open and closed; to provide means whereby the relative lengths of times during which the switches are open and closed may be varied; and such further objects, advantages and capabilities as will later more fully appear and as are inherent in the structure disclosed herein.

Our invention further resides in the combination, construction and arrangement of parts illustrated in the accompanying drawing, and, while we have shown therein what is now considered the preferred embodiment of our invention, we desire the same to be understood as illustrative only and not as limiting said invention.

Figure 1:
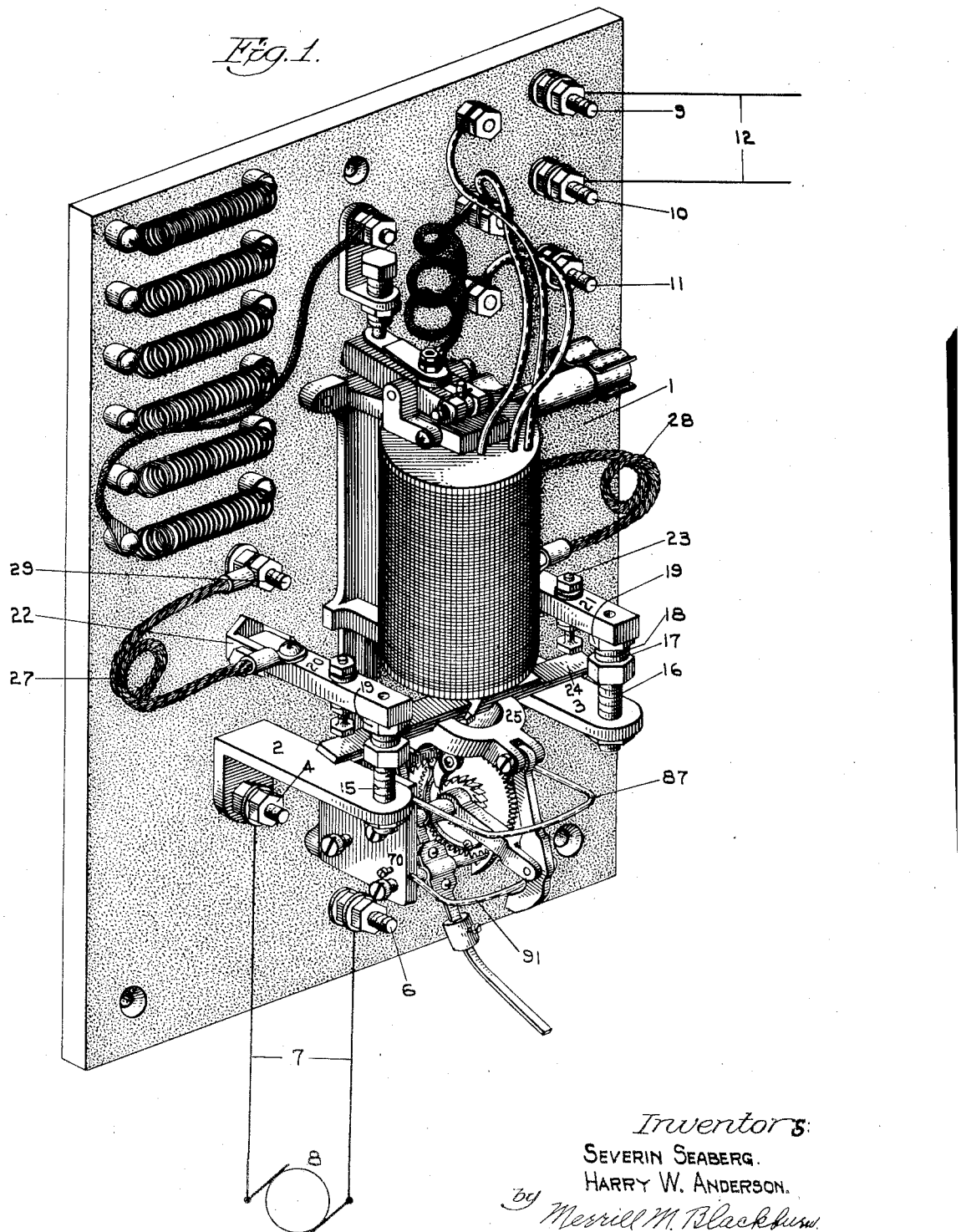
Figure 2:
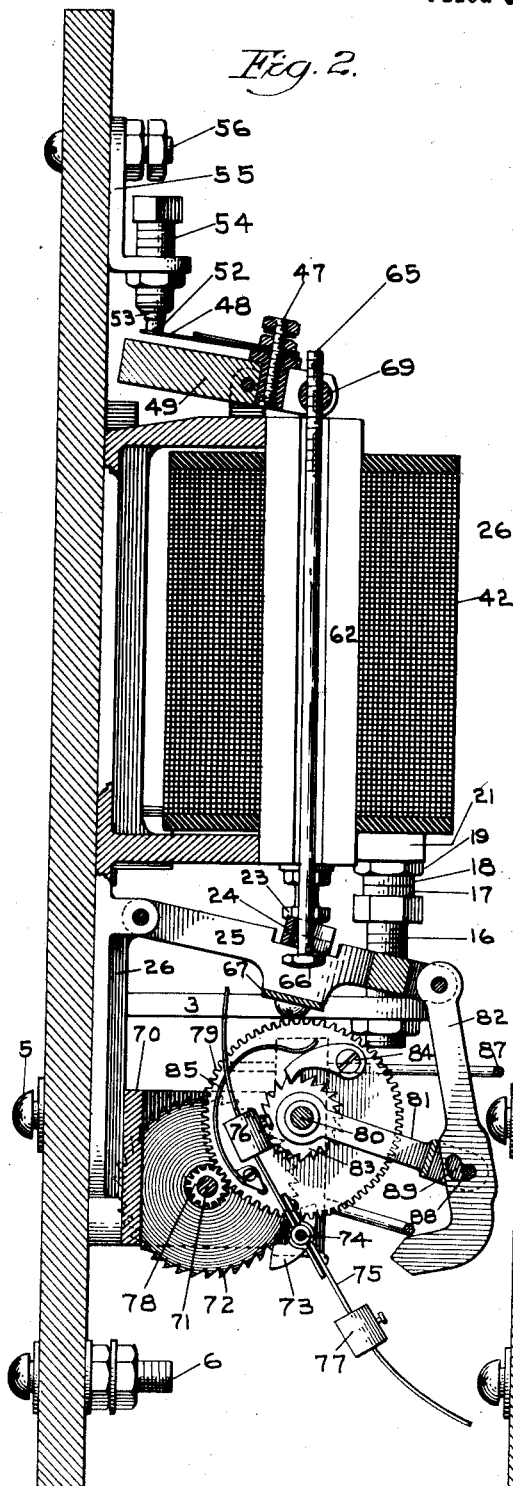
Figure 3:
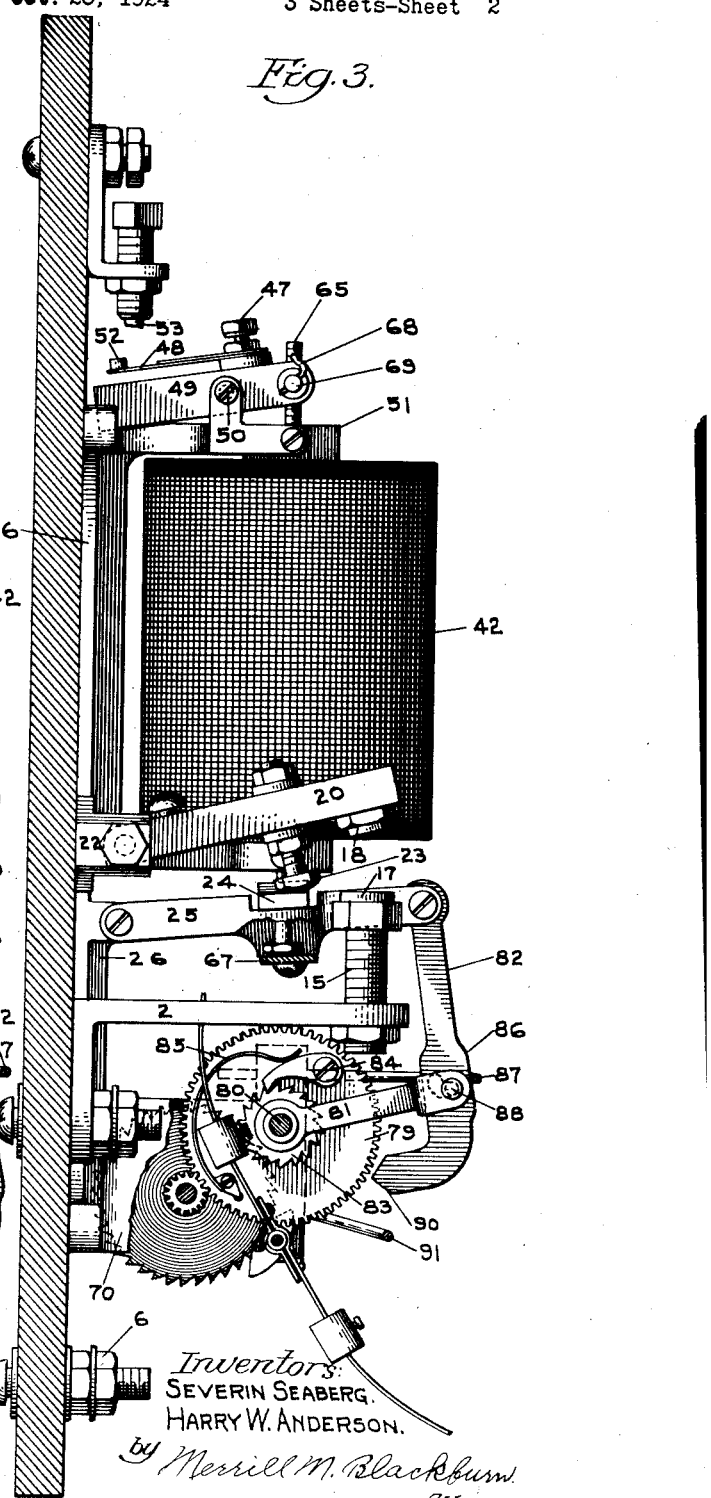

In the drawing annexed hereto and forming apart hereof, Fig. 1 is a perspective view of the present preferred embodiment of our invention; Fig. 2 is a longitudinal substantially central vertical section of the construction shown in Fig. 1; Fig. 3 is a similar view taken to the left of the magnetic coil shown in the center of Fig. 1; Fig. 4 is a diagrammatic layout of the electrical circuit, showing power lines and load lines connected thereto.

Referring more in detail to the annexed drawings, numeral 1 designates a panel of electrical insulating material upon which are mounted a pair of brackets 2 and 3, which are secured to the panel by means of bolts and nuts 4 and 5 or equivalent fastening means. A third fastening means 6 is attached to the panel but does not carry any bracket. Power leads 7 connect direct or alternating current generator 8 with the securing means 4 and 6.

Also mounted upon the panel 1 are securing means 8, 10 and 11 to which are connected the leads 12 of the load circuit. If this device is used in connection with a three wire system, the third wire is connected to the fastening member 5, as indicated at 13 and the third wire of the load circuit is connected with the terminal 11 as indicated at 14.

Mounted in the brackets 2 and 3 are adjustable contact members 15 and 16 which may be adjusted vertically to vary the timing of the open and closed periods of the main or feed circuit. Each of these adjustable members is provided with a facing piece 17 which is especially resistant to the action of the electrical arc produced upon the separation of the contacts. Like facing pieces 18 are provided upon the contact members 19 mounted on arms 20 and 21 pivotally carried by the brackets 22 secured to the panel 1. Adjustably secured to the arms 20 and 21 are members 23 which are engaged in operation by the extremities of the cross-bar 24 secured approximately centrally across a Y-shaped lever 25, which is, in turn, carried by a metallic supporting member 26 which supports various other parts of the mechanism upon the panel 1 as will be indicated hereinafter.

Flexible cables 27 and 28 are respectively connected at one end to the arms 20 and 21 and have their other ends connected to the securing members 29 and 30. From the securing member 29 a wire 31 leads to the securing member 9 and, together with cable 27, switch arm 20, bracket 2 and the associated parts, constitutes a part of the feed circuit. The other part of the feed circuit comprises feed wires 32 and 33 connecting contacts 6, 34 and 10. Connecting the contacts 30 and 11 and forming a part of the feed system of a three wire circuit is a lead 35, whereby current will be conducted from the bracket 3 through the arm 21, cable 28 and feed wire 35 to the third wire 14 of the load circuit.

A shunt circuit connects the contacts 4 and 34 as will be obvious from an inspection of Fig. 4. One element of this shunt circuit is the fuse 36 which is designed to prevent the apparatus from starting a fire in event an undue amount of current should go through the apparatus. This fuse connects the contacts 34 and 37, which latter is connected by a lead 38 with a contact 39, corresponding to the contact 11, though not necessarily positioned opposite to it as shown in the drawing.

Another pair of contacts 40 and 41 are provided whose use will presently be set forth. Extending from the contact 39 to the middle of magnetic coil 42 is a lead wire 43, while a similar lead wire 44 extends from the end of the magnetic coil to the contact or binding post 41. The latter has no other connection and its sole purpose is to serve as a securing means for holding the free end of either 43 or 44, depending upon which one is in use. When this device is used in connection with an alternating current circuit the connections will be as shown in Fig. 4 of the drawing, but if it is desired to use it with a direct current circuit the wires 43 and 44 will be disconnected from the binding posts 39 and 41 and interchanged, the wire 43 being connected to post 41 and the wire 44 being connected to post 39. This will put the whole of coil 42 in the shunt circuit, which is desirable when direct rather than alternating current is to be used. The other end of the magnetic coil 42 is connected through a lead 45 with the binding post 40 and from this a lead 46 extends to the binding post 47 where it is connected with the contact member 48 which is insulated from the lever 49 pivoted at 50 upon an extension 51 from the bracket 26. The contact strip 48 is resilient and carries a piece 52 which is resistant to the effects of the electric arc produced when the contact points are separated. The contact point 52 co-operates with a like member 53 upon the adjustable member 54 which is carried by a bracket 55, the latter in turn being secured to the panel 1 by means of a contact member or binding post 56. From the latter a feed wire 57 extends either to the binding post 58 or 59. The connection between 56 and 58, as shown in Fig. 4 is used with alternating current, while that between 56 and 59 is used with direct current in order that the resistors 60 may be brought into the circuit. It will be readily understood that a greater resistance in the shunt circuit is required with a direct current than with an alternating current. From the contact 58 a lead 61 extends to the binding post 4, thus completing the shunt circuit, which is used for control purposes.

The magnetic coil 42 is provided with a laminated core 62 which attracts the readily magnetizable bar 24 referred to above. This bar, when it is drawn toward the core, engages the adjustable members 23 and swings the pivoted levers 20 and 21 about their pivots, thus separating the contact elements 17 and 18 as will be obvious from Fig. 4. When these contacts are separated, the circuit through the feed lines to the load will be broken and the current will, therefore, not be supplied to the load circuit until the contacts are again brought into engagement as will be later explained. The cross-bar or armature 24 is provided in one edge with a notch 64 in which slides a bolt 65 having its head 66 on the underside of the armature. A cross-plate 67 is secured to the underside of the Y-shaped lever 25 to which the armature 24 is fastened, as shown more clearly in Figs. 1, 2 and 3. This will result in the separation of the contacts 52 and 53, in event the lever 49 should, for any reason, fail to turn about its pivot 50. The important result of this construction is that the contacts 17, 18 and 52, 53 are very quickly separated at the time the circuit is broken. There will be but a momentary surge of the current through the shunt circuit at the time of the closing of the contacts 52 and 53, for as soon as these contacts are closed a magnetic flux will be generated in the coil 42 which will result in the pulling upwardly of the armature 24, thus resulting in again breaking the circuit through the shunt. It will be apparent that the lever 49 is so balanced that as soon as the Y lever 25 is raised in the slightest the contacts 52 and 53 will be separated, in the normal action of the apparatus. Also, these contacts will remain separated until the weight of the lever 25 and armature 24 draws the bolt 65 downwardly sufficiently to actuate the lever 49 until the contact 52 engages the contact 53. This operation will be evident from Fig. 2 of the drawing. A certain latitude of adjustment of the bolt 65 is permitted in order to get the apparatus into the best operating position. After this position is reached, a wire 68 is inserted through openings in the bolt 65 and bearing member 69 to hold these two from relative rotary motion, which would result in the apparatus getting out of adjustment. It will be clear that it would be impossible, with the bolt 65 going through the bearing member 69 for the latter to rotate and it would be also impossible for it to slide lengthwise out of its bearing in the lever 49. The wire 68 could, therefore, be secured in another way in order to prevent the bolt 65 from turning, but the construction indicated is believed to be the preferable structure.

The mechanism whereby the timing of the feed and shunt circuits is controlled and the quick making of the feed circuit accomplished will next be described. Connected to the bracket 26 is a bracket 70 which supports the timing mechanism. A shaft 71 supported at its ends by adjustable bearings carries an escapement gear 72 which cooperates with an escapement pawl 73 to retard the action of the train of gears which controls the speed of descent of the lever 25. The pawl 73 is secured to a shaft 74 mounted in appropriate adjustable bearings in the bracket 70 and on this shaft 74 is secured, preferably adjustably, a cross-arm 75 carrying adjustable weights 76 and 77. By appropriately adjusting these weights upon the arm 75 this governor for the pawl may be accurately balanced and the rate of escapement may be adjusted, thereby varying the length of the periods of open and closed circuit. A pair of gears 78 and 79, the former carried by the shaft 71 and the latter by a shaft 80 synchronize the movements of the escapement wheel 72 and the lever 25. This results from the fact that an arm 81 is connected at one end to the shaft 80 and at its opposite end, through a link, 82, with the lever 25. A ratchet wheel 83 is rigidly connected with the arm 81 and loosely mounted upon the shaft 80. It is therefore free to turn in one direction relatively to the gear 79 while relative turning in the opposite direction is prevented by engagement of the pawl 84 with the teeth of the ratchet wheel, this pawl being pivotally mounted upon the gear 79 and held in engagement with the ratchet by means of a spring 85. It will be apparent from this that, when the armature 24 is raised by the magnetic coil 42, the link 82 will also be raised and this will turn the arm 81 upon the shaft 80, advancing the ratchet wheel 83 one notch with respect to the pawl 84. When the shunt circuit is broken by this upward movement of the parts and the weight thereof causes the train of gears and the escapement mechanism to function, the position of the pawl is slightly advanced and the latter will engage the next tooth of the ratchet upon the next upward movement of the parts.

The quick closing action of the main or feed circuit switches will next be described. When the parts reach the position shown in Fig. 2, the shunt circuit is closed and the current flows through the coil 42 thus causing the armature to be lifted and, along with it, the link 82 and arm 81. As the link 82 moves upwardly the cam 86 thereon engages the bar 87 which is adjustably mounted on the bracket 70. This forces the ring 82 inwardly to the position shown in Fig. 3 and holds it there with a crosspin 88 in the outer end of the curved slot 89 in the link 82. As the weight of the parts causes the escapement mechanism to function, the link 82 which is provided with a cam face 90, moves downwardly carrying this cam face into engagement with the bar 91 which is also adjustably mounted on the bracket 70. This action forces the lower end of the link 82 outwardly so that the pin 88 goes into the inner upwardly extending portion of the slot 89 and the link is thereby permitted to drop suddenly, thus causing quick engagement between the contact points 17 and 18, whereby accidental arcing between these points is prevented during the closing of the switch. While the link 82 is shown with a lateral offset which carries the cam face 90, this is not necessary, since the cam face may be formed directly upon the side of the link and supporting arm of the bar 91 may be extended accordingly so as to bring the crossbar out far enough to engage the cam. The same effect can be produced by shortening the arm 81 and forming the cam face on the edge of the link 82 as described above. These and other obvious mechanical equivalents are, of course, included within the spirit of our invention.

As shown in dotted lines in Figs. 2 and 3, the sides of the bracket 70 have upwardly extending projections through which the supporting arms of the crossbar 87 extend, while means, such as screws, is provided for holding these arms in properly adjusted position. Similar means is resorted to for holding crossbar 91 in adjusted position.

If it should be found that undue arcing occurs, this can be reduced by disconnecting the wires 44 and 45 from binding posts 39 and 40 and interchanging them. This changes the polarity of the electromagnet and reduces the arc to a minimum.

While we have shown and described specific mechanism embodying our invention, it is, of course, understood that this is only for purpose of illustration of said invention and that various changes may be resorted to without departing from the spirit thereof.

Having now described our invention, we claim:

1. In a magnetic circuit control apparatus for controlling the flow of current through a load circuit, a pair of switches having magnetic means connected therewith for opening both switches, in combination with means for timing the reclosing of the switches, comprising means for simultaneously varying the times the switches are open and closed and means for relatively varying the open and closed periods.

2. In a magnetic circuit controlling apparatus, a pair of switches, magnetic means in series with one of said switches for opening both switches, in combination with means for timing the reclosing of each of the switches.

3. In a magnetic circuit control apparatus, a pair of switches, one of said switches having magnetic means in series therewith for opening both switches, in combination with means for varying the time of closing of the switches and independent means for varying the time of closing of one of the switches.

4. In a magnetic circuit control mechanism, supporting means, shafts rotatably mounted thereon, escapement mechanism carried by said shafts, a crank for operating the escapement mechanism in one direction, a lever pivoted on the support above the crank, an electromagnet for operating the lever, switches opened by the lever, and a link connecting the lever and crank so that actuation of the lever by the electromagnet will cause functioning of the escapement mechanism.

5. In a magnetic circuit control apparatus, timing mechanism comprising supporting means, a lever pivoted thereon and shafts carried thereby, a switch opened by the lever, escapement mechanism carried by the shafts, a crank connected with the escapement mechanism, connections between the crank and the lever whereby movement of the lever in one direction is retarded, and means whereby the speed of the escapement mechanism may be regulated.

6. In a magnetic circuit control apparatus, timing mechanism comprising supporting means, a lever pivoted thereon and shafts carried thereby, a switch actuated to open position by the lever, escapement mechanism carried by the shafts, connections between the escapement mechanism and the lever whereby movement of the lever in one direction is retarded, means whereby the speed of the escapement mechanism may be regulated, including a cross arm associated with the escapement pawl and adjustable weights carried by the cross-arm.

7. In a structure of the character described a switch, a magnetically actuated bar for opening said switch, a lever carrying said bar, a link connected to said lever, an arm connected to the link, and escapement mechanism actuated by movement of the arm in one direction.

8. In a structure of the character described, a switch, a magnetically actuated bar for opening said switch, a lever carrying said bar, a link connected to said lever, an arm connected to the link, said link having a curved slot therein and said arm having a pin extending through the slot, escapement mechanism actuated by movement of the arm in one direction, and means to cause movement of the link so that it may move independently of the escapement mechanism to cause rapid closing of the switch.

9. In a magnetic circuit control apparatus, timing mechanism comprising supporting means, a lever pivoted thereon, switches actuated by the lever, escapement mechanism carried by the supporting means and cooperating with the lever, means connecting the lever and escapement mechanism so that the lever may function freely in one direction and be retarded by the escapement mechanism in its movement in the opposite direction and means for automatically relieving the lever from the controlling influence of the escapement mechanism.

10. In a magnetic control apparatus, an electromagnet, a switch operating bar within the field of the electromagnet, means for controlling the movements of said bar in one direction, connections between the last named means and the bar whereby the bar may operate freely in one direction and be retarded in its movement in the opposite direction, and means for automatically releasing the bar from the control of said controlling means when moving under the control thereof.

In witness whereof, we hereunto subscribe our names to this specification.

SEVERIN SEABERG.
HARRY W. ANDERSON.